United States Patent
Aoki et al.

(10) Patent No.: US 11,034,810 B2
(45) Date of Patent: Jun. 15, 2021

(54) EPOXY RESIN COMPOSITION, PREPREG, AND CARBON FIBER-REINFORCED COMPOSITE MATERIAL

(71) Applicant: TORAY INDUSTRIES, INC., Tokyo (JP)

(72) Inventors: Junichi Aoki, Iyo-gun (JP); Koji Furukawa, Iyo-gun (JP); Atsuhito Arai, Iyo-gun (JP); Jun Misumi, Iyo-gun (JP); Hiroaki Sakata, Iyo-gun (JP); Takashi Ochi, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 137 days.

(21) Appl. No.: 16/491,050

(22) PCT Filed: Mar. 5, 2018

(86) PCT No.: PCT/JP2018/008276
§ 371 (c)(1),
(2) Date: Sep. 4, 2019

(87) PCT Pub. No.: WO2018/173716
PCT Pub. Date: Sep. 27, 2018

(65) Prior Publication Data
US 2020/0010633 A1 Jan. 9, 2020

(30) Foreign Application Priority Data
Mar. 22, 2017 (JP) .............................. JP2017-055612

(51) Int. Cl.
*C08J 5/24* (2006.01)
*C08L 63/00* (2006.01)

(52) U.S. Cl.
CPC ................. *C08J 5/24* (2013.01); *C08L 63/00* (2013.01); *C08L 2205/025* (2013.01); *C08L 2205/03* (2013.01)

(58) Field of Classification Search
CPC .............................. C08J 5/24; C08L 63/00–10
See application file for complete search history.

(56) References Cited

U.S. PATENT DOCUMENTS

| 2013/0005855 A1 | 1/2013 | Arai et al. |
| 2018/0134837 A1 | 5/2018 | Furukawa et al. |

FOREIGN PATENT DOCUMENTS

| JP | 2012-1583 A | 1/2012 |
| JP | 2014-36172 A | 2/2014 |
| WO | WO 2011/118106 A1 | 9/2011 |
| WO | WO 2016/204173 A1 | 12/2016 |

OTHER PUBLICATIONS

International Search Report, issued in PCT/JP2018/008276, PCT/ISA/210, dated May 22, 2018.
Written Opinion of the International Searching Authority, issued in PCT/JP2018/008276, PCT/ISA/237, dated May 22, 2018.

*Primary Examiner* — Kregg T Brooks
(74) *Attorney, Agent, or Firm* — Birch, Stewart, Kolasch & Birch, LLP

(57) ABSTRACT

An object of the present invention is to provide an epoxy resin composition capable of providing a carbon fiber-reinforced composite material that is excellent in moldability, heat resistance, and mechanical properties such as tensile strength and compression strength, and a prepreg. The present invention provides an epoxy resin composition containing at least components [A] to [D] shown below: [A]: an epoxy resin having a xylene group; [B]: a glycidyl amine epoxy resin having three or more glycidyl groups in a molecule; [C]: a thermoplastic resin; and [D]: an aromatic polyamine, the epoxy resin composition containing 10 to 80 parts by mass of the component [A] and 20 to 90 parts by mass of the component [B] based on 100 parts by mass in total of epoxy resins, and also 1 to 25 parts by mass of the component [C] based on 100 parts by mass in total of epoxy resins.

12 Claims, No Drawings

EPOXY RESIN COMPOSITION, PREPREG, AND CARBON FIBER-REINFORCED COMPOSITE MATERIAL

TECHNICAL FIELD

The present invention relates to an epoxy resin composition suitably used in a carbon fiber-reinforced composite material. More specifically, the present invention relates to an epoxy resin composition capable of providing a carbon fiber-reinforced composite material that is excellent in moldability, heat resistance, and mechanical properties such as tensile strength and compression strength.

BACKGROUND ART

In recent years, carbon fiber-reinforced composite materials (hereinafter sometimes abbreviated as "composite materials") have been extensively used in a wide variety of applications such as aircraft, automobiles, sports equipment, fishing equipment, blades for wind power generation, and casings of personal computers based on their high specific strength and high specific elastic modulus. Many of these structures have a complicated shape, and often include carbon fiber-reinforced fiber woven fabric prepregs. The carbon fiber-reinforced fiber woven fabric prepregs are sheet-like and flexible, and thinned prepregs can be laminated to exhibit isotropy of the material.

Resin compositions widely used in the prepreg are thermosetting resins excellent in mechanical properties, heat resistance, and handleability in the process, in particular, an epoxy resin. In recent years, materials for structures such as aircraft and automobiles are increasingly required to have improved mechanical properties in order to achieve further weight reduction. As for mechanical properties, there is an increasing demand for maintaining physical properties in a moistened high-temperature environment so that the composite material can have further improved tensile strength and compression strength that are important properties, and that the composite material can also endure use in a humid high-temperature environment. As for the tensile strength of the composite material, it is effective to lower the cross-linking density of the cured product of the epoxy resin composition (hereinafter abbreviated as "cured product") in addition to the improvement in tensile strength of the carbon fiber serving as a base material. Lowering the cross-linking density, however, causes a problem that the heat resistance is lowered. Meanwhile, in order to improve the compression strength of the composite material, it is effective that the cured product has high elastic modulus (Patent Document 1). Moreover, in order to improve heat resistance, it is effective to introduce a rigid aromatic skeleton. Patent Documents 2 and 3 disclose a resin composition having a xylene group, and having low surface roughness and low linear expansion coefficient.

PRIOR ART DOCUMENTS

Patent Documents

Patent Document 1: Japanese Patent Laid-open Publication No. 2002-363253
Patent Document 2: Japanese Patent Laid-open Publication No. 2016-136645
Patent Document 3: International Publication No. 2013-008684

SUMMARY OF THE INVENTION

Problems to be Solved by the Invention

In order to improve the compression strength, it is effective to increase the cross-linking density of the cured product of the resin composition to improve the elastic modulus of the cured product. However, there is a trade-off relationship that a high compression strength leads to decrease in the tensile strength. Therefore, satisfying both the tensile strength and the compression strength of the composite material is a very difficult problem. Moreover, Patent Documents 2 and 3 disclose an invention for use in an electronic information material that contains a large amount of an inorganic filler. Patent Documents 2 and 3, however, do not mention any mechanical properties that are important in a composite material serving as a structural material of the electronic information material, and moreover, the compositions of Patent Documents 2 and 3 are insufficient in heat resistance.

In order to satisfy both the tensile strength and the compression strength of the composite material, it is considered effective to suppress the movement of molecular chains or reduce the freedom of movement of molecular chains by introducing an interaction site between the molecular chains while keeping the cross-linking density of the cured product low. As for a technique of suppressing the movement of molecular chains in the cured product, it is considered effective to increase the number of epoxy functional groups for increasing the cross-linking density, or to introduce into molecular chains a bent structure or a molecular structure that easily causes interaction between molecular chains. Furthermore, in order to maintain the mechanical properties in a moistened high-temperature environment, it is considered effective to make the inside of molecular chains a hydrophobic environment to reduce the water absorbability or to reduce the free volume space in molecular chains.

Accordingly, an object of the present invention is to provide an epoxy resin composition capable of providing a carbon fiber-reinforced composite material that is excellent in moldability, heat resistance, tensile strength, and compression strength.

Solutions to the Problems

The inventors of the present invention intensively studied the above-mentioned problems. As a result, they clarified that the problems can be solved by mixing specific epoxy resin components within specific ranges, and achieved the present invention.

More specifically, the epoxy resin composition of the present invention is an epoxy resin composition containing at least components [A] to [D] shown below:
[A]: an epoxy resin having a xylene group;
[B]: a glycidyl amine epoxy resin having three or more glycidyl groups in a molecule;
[C]: a thermoplastic resin; and
[D]: an aromatic polyamine,
the epoxy resin composition containing 10 to 80 parts by mass of the component [A] and 90 to 20 parts by mass of the component [B] based on 100 parts by mass in total of epoxy resins, and also 1 to 25 parts by mass of the component [C] based on 100 parts by mass in total of epoxy resins.

Further, the prepreg of the present invention is a prepreg including a reinforced fiber, and the epoxy resin composition impregnated into the reinforced fiber. The reinforced fiber may be a base material in the form of a woven fabric. Furthermore, the fiber-reinforced composite material of the present invention is a fiber-reinforced composite material that is a cured product of the prepreg, or a carbon fiber-reinforced composite material including a cured product of the epoxy resin composition and a carbon fiber.

Effects of the Invention

According to the present invention, it is possible to provide an epoxy resin composition capable of providing a carbon fiber-reinforced composite material that is excellent in moldability, heat resistance, and mechanical properties such as tensile strength and compression strength, a prepreg, and a carbon fiber-reinforced composite material.

EMBODIMENTS OF THE INVENTION

The epoxy resin composition, the prepreg, and the carbon fiber-reinforced composite material of the present invention will be described in detail below.

The component [A] used in the present invention is an epoxy resin having a xylene group. The epoxy resin having a xylene group is not particularly limited, and is an epoxy resin having a xylene-formaldehyde resin structure. Examples of the epoxy resin include an epoxy resin having a glycidyl-etherified molecular structure, which is obtained by reacting xylene, a phenol, and formaldehyde to produce a phenol resin, and reacting epichlorohydrin on the phenol resin, and an epoxy resin having a glycidyl-etherified molecular structure, which is obtained by reacting xylene with formaldehyde to produce a resin, further adding a phenol and formaldehyde to the resin to induce a reaction, thereby obtaining a phenol resin, and reacting epichlorohydrin on the phenol resin.

The amount of the component [A] is 10 to 80 parts by mass, preferably 40 to 80 parts by mass, more preferably 40 to 60 parts by mass based on 100 parts by mass in total of epoxy resins. Such an amount of the component [A] can balance the properties of the cured resin and the mechanical properties of the composite material at a high level.

The epoxy equivalent of the component [A] is preferably 200 to 350 g/eq. This is because such epoxy equivalent can suppress significant deterioration in the tensile strength, compression strength, heat resistance, and physical properties in a moistened high-temperature environment. This is probably because the cross-linking density and the elastic modulus are well-balanced.

Examples of commercially available products of the component [A] include "jER (registered trademark)" YX7700 (manufactured by Mitsubishi Chemical Corporation) having an epoxy equivalent of 260 to 285 g/eq. It is described in Japanese Patent Laid-open Publication No. 2014-5375 that "jER (registered trademark)" YX7700 is a phenol-modified xylene resin type epoxy resin.

The component [B] used in the present invention is a glycidyl amine epoxy resin having three or more glycidyl groups in a molecule. The number of glycidyl groups in a molecule is preferably 3 or 4 because the mechanical properties and heat resistance of the composite material are well-balanced. Compounds preferably used as the component [B] include diaminodiphenylmethane, diaminodiphenyl sulfone, diaminodiphenyl ether, xylenediamine, aminophenol, structural isomers of these compounds, and products obtained by glycidylating, as a precursor, a derivative having a halogen or an alkyl substituent having 3 or less carbon atoms. More specific examples of the component [B] include tetraglycidyl diaminodiphenylmethane, a glycidyl compound of xylenediamine, triglycidyl aminophenol, tetraglycidyl diaminodiphenyl sulfone, and tetraglycidyl diaminodiphenyl ether.

Examples of commercially available products of the component [B] include the following products. Examples of commercially available products of tetraglycidyl diaminodiphenylmethane include "SUMI-EPDXY (registered trademark)" ELM434 (manufactured by SUMITOMO CHEMICAL COMPANY, LIMITED), and "Araldite (registered trademark)" MY720, "Araldite (registered trademark)" MY721, "Araldite (registered trademark)" MY9512, "Araldite (registered trademark)" MY9612, "Araldite (registered trademark)" MY9634, and "Araldite (registered trademark)" MY9663 (all manufactured by Huntsman Advanced Materials LLC). Examples of commercially available products of a glycidyl compound of xylenediamine include TETRAD-X (manufactured by MITSUBISHI GAS CHEMICAL COMPANY, INC.). Examples of commercially available products of triglycidyl aminophenol include "Araldite (registered trademark)" MY0500 and "Araldite (registered trademark)" MY0510 (both manufactured by Huntsman Advanced Materials LLC) and "jER (registered trademark)" 630 (manufactured by Mitsubishi Chemical Corporation) each having p-aminophenol as a precursor, and "Araldite (registered trademark)" MY0600 and "Araldite (registered trademark)" MY0610 (both manufactured by Huntsman Advanced Materials LLC) each having m-aminophenol as a precursor. Examples of commercially available products of tetraglycidyl diaminodiphenyl sulfone include TGDDS (manufactured by Konishi Chemical Ind. Co., Ltd.).

The component [B] may be a blend of two or more different epoxy resins selected from these.

The amount of the component [B] is 90 to 20 parts by mass, preferably 60 to 20 parts by mass, more preferably 60 to 40 parts by mass based on the total amount of epoxy resins for balancing the mechanical properties at a high level. The total amount of epoxy resins that is the sum of the component [A] and the component [B] is 100 parts by mass.

The mixing ratio [A]/[B] between the component [A] and the component [B] that are contained in the epoxy resins is a value calculated by dividing the number of parts by mass of the component [A] contained in the epoxy resins by the number of parts by mass of the component [B] contained therein. A value of [A]/[B] of 0.25 to 2.3 is preferable because the properties of the cured resin as well as mechanical properties can be balanced at a high level.

The component [C] used in the present invention is a thermoplastic resin. From the viewpoint of imparting high heat resistance, a thermoplastic resin having a Tg of 180° C. or higher and having an aromatic ring in the molecule is preferable. More specifically, polyethersulfone, polyether ether sulfone, polyetherimide, polyphenyleneoxide, polysulfone or the like is preferably used.

Examples of commercially available products of the sulfone-based or imide-based thermoplastic resin include: "Sumika Excel (registered trademark)" PES5003P (manufactured by SUMITOMO CHEMICAL COMPANY, LIMITED) having a hydroxyl group at a terminal, "Virantage (registered trademark)" VW10700 (manufactured by Solvay Advanced Polymers LLC), and "Sumika Excel (registered trademark)" PES7600P (manufactured by SUMITOMO CHEMICAL COMPANY, LIMITED) that is chlorinated at a terminal as polyethersulfone; "ULTEM (registered trademark)" 1010 (manufactured by Sabic Innovative Plastics) having an acid anhydride or an amino group at a terminal as polyetherimide; and "Virantage (registered trademark)" VW30500 (manufactured by Solvay Advanced Polymers LLC) as polysulfone.

The amount of the thermoplastic resin [C] is 1 to 25 parts by mass based on 100 parts by mass in total of epoxy resins. When the amount of the thermoplastic resin [C] is within the above-mentioned range, the carbon fiber-reinforced composite material well exhibits the mechanical properties, and is also excellent in handleability in terms of tackiness and drapability, and the viscosity of the epoxy resin composition can be adjusted within an appropriate range. Therefore, the amount of the thermoplastic resin [C] is preferably 1 to 15 parts by mass.

The component [D] used in the present invention is an aromatic polyamine, and is a compound having an amino group that is an active group capable of reacting with an epoxy resin. The epoxy resin hardener preferably has as high preservation stability as possible. Since a liquid hardener is highly reactive, the hardener is preferably solid at 23° C. The aromatic polyamine [D] preferably has 1 to 4 phenyl groups in the molecule from the viewpoint of heat resistance and mechanical properties. Furthermore, it is more preferable that the epoxy resin hardener be an aromatic polyamine compound having at least one phenyl group contained in the skeleton of the epoxy resin hardener, and that the phenyl group have an amino group at an ortho position or a meta position. This is because such hardener imparts a bent structure of the molecular skeleton to improve the resin elastic modulus, and can contribute to improvement in the mechanical properties. Specific examples of the aromatic polyamine include meta-phenylenediamine, diaminodiphenylmethane, diaminodiphenyl sulfone, meta-xylylenediamine, (p-phenylene methylene)dianiline, various derivatives such as alkyl-substituted derivatives of these compounds, and isomers having different positions of amino groups. These hardeners can be used alone or two or more kinds of them can be used in combination. Among them, diaminodiphenylmethane and diaminodiphenyl sulfone are preferable from the viewpoint of imparting heat resistance to the cured product.

Examples of commercially available products of the aromatic polyamine [D] include SEIKACURE S (manufactured by Wakayama Seika Kogyo Co., Ltd.), MDA-220 (manufactured by Mitsui Chemicals, Inc.), "jER Cure (registered trademark)" (manufactured by Mitsubishi Chemical Corporation), 3,3'-DAS (manufactured by Mitsui Fine Chemicals, Inc.), "Lonzacure (registered trademark)" M-DEA (manufactured by Lonza), "Lonzacure (registered trademark)" M-DIPA (manufactured by Lonza), "Lonzacure (registered trademark)" M-MIPA (manufactured by Lonza), and "Lonzacure (registered trademark)" DETDA 80 (manufactured by Lonza).

The amount of the epoxy resin hardener [D] varies depending on the combination with epoxy resins. Setting the ratio of the amount of active hydrogen in the epoxy resin hardener [D] to epoxy groups in the epoxy resins contained in the resin composition to 0.6 to 1.4 is preferable because such ratio can sufficiently advance the curing and can reduce an adverse influence on the mechanical properties due to an excessively large amount of the hardener. The ratio is more preferably 0.65 to 1.4.

In addition, an accelerator can be used in combination with the epoxy resin hardener [D] of the present invention. Examples of the accelerator include a tertiary amine, a tertiary amine salt, a lewis complex, an onium salt, an imidazole compound, a urea compound, and a hydrazide compound. A mixture of two or more of them can also be used as necessary. The amount of the accelerator is preferably 0.01 to 10 mass % based on the total amount of the epoxy resin composition. This is because if the amount of the accelerator is too small, curing may not be sufficiently accelerated, whereas if the amount is too large, mechanical properties may be deteriorated and preservation stability of the resin composition may be impaired. When the amount of the accelerator is within the above-mentioned range, the effect of improving the curing reactivity of the resin composition is obtained, and deterioration in thermal stability of the resin composition and in heat resistance of the cured product can be suppressed.

In the present invention, it is also possible to use, in addition to the components [A] to [D], an additional epoxy resin having a functionality of two or more as a component [E]. Adding an epoxy resin having a functionality of two or more makes it possible to well-balance mechanical properties and heat resistance, and to adjust the viscosity of the resin appropriately. In the case where the additional epoxy resin having a functionality of two or more is used, the sum of the epoxy resins of the components [A], [B], and [E] is the total amount of epoxy resins. Preferable examples of the epoxy resin having a functionality of two or more include a bisphenol epoxy resin, an epoxy resin having a biphenyl skeleton, an epoxy resin having a naphthalene group, an epoxy resin having a binaphthalene skeleton, and a novolac epoxy resin. As for commercially available products of the epoxy resin having a functionality of two or more, examples of a bisphenol A epoxy resin include "jER (registered trademark)" 825, "jER (registered trademark)" 826, "jER (registered trademark)" 827, "jER (registered trademark)" 828, "jER (registered trademark)" 834, "jER (registered trademark)" 1001, "jER (registered trademark)" 1002, "jER (registered trademark)" 1003, "jER (registered trademark)" 1004, "jER (registered trademark)" 1004AF, "jER (registered trademark)" 1007, and "jER (registered trademark)" 1009 (all manufactured by Mitsubishi Chemical Corporation), "EPICLON (registered trademark)" 850 (manufactured by DIC Corporation), "Epotohto (registered trademark)" YD-128 (manufactured by NIPPON STEEL & SUMIKIN CHEMICAL CO., LTD.), and DER-331 and DER-332 (manufactured by The Dow Chemical Company). Examples of commercially available products of a bisphenol F epoxy resin include "jER (registered trademark)" 806, "jER (registered trademark)" 807, "jER (registered trademark)" 1750, "jER (registered trademark)" 4002, "jER (registered trademark)" 4004P, "jER (registered trademark)" 4007P, and "jER (registered trademark)" 4009P (all manufactured by Mitsubishi Chemical Corporation), "EPICLON (registered trademark)" 830 (manufactured by DIC Corporation), and "Epotohto" (registered trademark)" YD-170, "Epotohto (registered trademark)" YD-175, "Epotohto (registered trademark)" YDF2001, and "Epotohto (registered trademark)" YDF2004 (manufactured by NIPPON STEEL & SUMIKIN CHEMICAL CO., LTD.). The amount of the epoxy resin having a functionality of two or more is preferably 5 to 40 parts by mass based on 100 parts by mass in total of epoxy resins because a composite material excellent in mechanical properties can be obtained.

The epoxy resin composition of the present invention may contain particles mainly containing a thermoplastic resin. The particles mainly containing a thermoplastic resin are blended to impart impact resistance to the fiber-reinforced composite material obtained in the present invention. In general, fiber-reinforced composite materials have a laminate structure. When an impact is applied to the laminate structure, high stress is generated between the layers, causing delamination damage. Therefore, in the case of improving the impact resistance against an external impact, it is required to improve the toughness of a resin layer formed between layers made of reinforced fibers in the fiber-reinforced composite material (hereinafter, such resin layer is sometimes referred to as "resin interlayer"). Blending the particles mainly containing a thermoplastic resin is for the purpose of selectively toughening the resin interlayer of the fiber-reinforced composite material obtained in the present invention, although the epoxy resin composition of the present invention contains the component [C] for imparting impact resistance. It is to be noted that the thermoplastic resin that is a main component of the particles may be the same as or different from the thermoplastic resin used in the component [C].

The thermoplastic resin that is a component of such particles is preferably a polyamide, a polyimide or the like. In particular, a polyamide that can greatly improve impact resistance owing to its excellent toughness is most preferable. As the polyamide, for example, polyamide 12, polyamide 11, polyamide 6, polyamide 66, a polyamide 6/12 copolymer, or a polyamide formed to have a semi IPN structure (interpenetrating polymer network structure) (semi IPN polyamide) with the epoxy compound described in Examples 1 to 7 of Japanese Patent Laid-open Publication No. 2009-221460 can be suitably used. The thermoplastic resin particles may be spherical particles, nonspherical particles, or porous particles. In a preferable aspect, however, the particles are spherical particles. This is because the particles do not lower the resin flow property and thus the resin is excellent in viscoelasticity, the particles have no origin of stress concentration, and the particles provide high impact resistance.

Usable commercially available products of the polyamide particles include SP-500, SP-10, TR-1, TR-2, 842P-48, and 842P-80 (all manufactured by Toray Industries, Inc.), "Orgasol (registered trademark)" 1002D, 2001UD, 2001EXD, 2002D, 3202D, 3501D, and 3502D (all manufactured by ARKEMA K.K.), "Grilamid (registered trademark)" TR90 and TR55 (both manufactured by EMS-CHEMIE (Japan) Ltd.), and "TROGAMID (registered trademark)" CX7323, CX9701, and CX9704 (all manufactured by Degussa AG). One kind of these polyamide particles can be used, or two or more kinds of them can be used in combination.

In order to selectively toughen the resin interlayer of the fiber-reinforced composite material obtained in the present invention, it is desirable to retain the particles mainly containing a thermoplastic resin in the resin interlayer. One suitably used technique of retaining the particles in the resin interlayer is a technique of laminating prepregs containing the particles placed on the fiber surface or in the epoxy resin composition. Therefore, the number average particle size of the particles mainly containing a thermoplastic resin is required to be within the range of 5 to 50 μm, preferably within the range of 7 to 40 μm, more preferably within the range of 10 to 30 μm. When the number average particle size is 5 μm or more, the particles can stay on the carbon fiber surface or in the interlayer epoxy resin composition layer of the obtained fiber-reinforced composite material without entering the bundle of reinforced fibers. When the number average particle size is 50 μm or less, the thickness of the matrix resin layer at the surface of the prepreg can be optimized, and furthermore, the fiber mass content can be optimized in the obtained fiber-reinforced composite material.

When the epoxy resin composition of the present invention is used as a matrix resin of a prepreg, the resin viscosity that is an index of the fluidity of the resin is measured as follows. More specifically, the minimum viscosity of the epoxy resin composition is determined using a dynamic viscoelasticity measurement device, for example, a dynamic viscoelasticity measurement device ARES-G2 (manufactured by TA Instruments Japan Inc.) by setting the epoxy resin composition between flat parallel plates each 40 mm in diameter as upper and lower jigs so that the distance between the upper and lower plates is 1 mm, and then measuring the viscosities at an angular frequency of 3.14 rad/s within the range of 40° C. to 160° C. at 1.5° C./min. When the minimum viscosity of the epoxy resin composition in the above-mentioned measurement is 0.1 Pa·s or more, preferably 0.5 Pa·s or more, excessive resin flow is less likely to occur during molding into the fiber-reinforced composite material, and variation in the reinforced fiber content can be suppressed. The minimum viscosity is the minimal or lowest viscosity value in the measurement temperature range. Meanwhile, when the minimum viscosity is 100 Pa·s or less, preferably 10 Pa·s or less, the reinforced fiber can be sufficiently impregnated with the epoxy resin composition during the production of a prepreg, and voids are less likely to be generated in the obtained fiber-reinforced composite material, so that a decrease in strength of the fiber-reinforced composite material can be suppressed. Therefore, the minimum viscosity of the epoxy resin composition is preferably 0.1 to 100 Pa·s, more preferably 0.5 to 10 Pa·s.

The epoxy resin composition of the present invention in combination with a carbon fiber can be used as a carbon fiber-reinforced composite material. The carbon fiber used may be any known carbon fiber. A carbon fiber having a strand tensile strength in a strand tensile test of 3,000 MPa or more and 7,500 MPa or less and an elastic modulus of 200 GPa or more and 450 GPa or less is preferably used. The strand tensile test refers to a test performed according to JIS R7601 (1986) after impregnating a carbon fiber bundle with a matrix resin having the following composition, and curing the resin at a temperature of 130° C. for 35 minutes.

3',4'-Epoxycyclohexylmethyl-3,4-epoxycyclohexanecarboxylate (for example, CELLOXIDE 2021P manufactured by Daicel Corporation): 100 parts by mass Boron trifluoride monoethylamine (for example, manufactured by STELLACHEMIFA CORPORATION): 3 parts by mass Acetone (for example, manufactured by Wako Pure Chemical Industries, Ltd.): 4 parts by mass The number of carbon fiber filaments is preferably 1,000 to 100,000, more preferably 2,000 to 50,000. If the number of carbon fiber filaments is less than 1,000, the operation of forming the carbon fiber into a prepreg becomes complicated. Conversely, if the number of carbon fiber filaments is more than 100,000, it may become difficult to impregnate the space between the filaments with the resin, and defective impregnation may occur.

As for the form of the carbon fiber, the carbon fiber is preferably used in the form of continuous fibers arranged unidirectionally, or in the form of a woven fabric such as plain weave, satin weave, and twill weave. It is preferable that the carbon fiber form a layer. Herein, continuous fibers mean fibers having an average length of 10 mm or more.

When the epoxy resin composition of the present invention is used as a fiber-reinforced composite material, it is possible to produce a prepreg by preliminarily impregnating a fiber base material with the resin, and molding the prepreg by the method described later.

The prepreg according to the present invention refers to any of the following products: a product obtained by impregnating an epoxy resin composition into a base material made of a carbon fiber, such as a sheet including unidirectionally arranged continuous carbon fibers, or a carbon fiber woven fabric; a product obtained by arranging on at least one surface of a carbon fiber base material a resin layer made from an epoxy resin composition; or a product obtained by impregnating part of an epoxy resin composition into a carbon fiber base material, and arranging the remaining part of the epoxy resin composition on at least one surface of the carbon fiber base material. It is preferable that the epoxy resin composition have fluidity at the time of impregnation or being arranged since this improves the workability when the epoxy resin composition is molded into a predetermined shape.

The prepreg can be produced by a wet process, a hot-melt process or the like described below. The wet process is a method of immersing a reinforced fiber base material in a solution containing an epoxy resin composition and a solvent, then removing the reinforced fiber base material from the solution, and evaporating the solvent using an oven or the like. The hot-melt process is a method of directly impregnating a reinforced fiber with an epoxy resin composition reduced in viscosity by heating, or a method of applying an epoxy resin composition once to release paper, a film or the like to make a thin film, then overlaying the thin film of the epoxy resin composition on both sides or one side of a layer made of a reinforced fiber, and heating and pressurizing the resulting laminate to transfer and impregnate the epoxy resin composition into the reinforced fiber. The hot-melt process is preferable because substantially no solvent remains in the prepreg.

The mass of the carbon fiber per unit area of the prepreg is preferably 70 to 1,000 $g/m^2$. If the mass of the carbon fiber is less than 70 $g/m^2$, it is necessary to laminate a large number of prepregs in order to achieve a predetermined thickness in forming the carbon fiber-reinforced composite material, so that the operation may be complicated. On the other hand, if the mass of the carbon fiber exceeds 1,000 $g/m^2$, the prepreg tends to have poor drapability. In addition, the carbon fiber content in the prepreg is preferably 30 to 90 mass %, more preferably 35 to 85 mass %, still more preferably 40 to 80 mass %. A carbon fiber content of 30 mass % or more is preferable because the high specific strength and the high specific elastic modulus that are the features of the carbon fiber-reinforced composite material can be effectively utilized. A carbon fiber content of 90 mass % or less is preferable because a uniform molded product is easily obtained.

As for an index showing the degree of impregnation of the prepreg, for example, JP-A-2016-510077 discloses a method for evaluating the degree of resin impregnation, in which the amount of water absorption when a cross section of the prepreg is immersed in water is used as an index. In this evaluation method, a smaller value means a smaller amount of water absorption, and also means that the gap in the reinforced fiber is filled with the resin and the degree of impregnation is high. More specifically, the degree of resin impregnation is evaluated according to the following procedure. A prepreg is cut into a size of 100 (±2) mm×100 (±2) mm, and the obtained samples are weighed (W1). The obtained strips of prepreg are positioned between PTFE-lined aluminum plates so that the strips protrude by 15 mm from one end of the PTFE-lined plate assembly and that the fiber orientation of the prepreg extends along the protruding parts. A clamp is arranged at an opposite end from the protruding parts, and 5 mm of the protruding parts are immersed in water. After being immersed for 5 minutes, the samples are removed from the water, and the water attached to the surface of the prepreg is removed with blotter paper. Then, the samples are weighed again (W2), and the water absorption coefficient is calculated from the formula: water absorption coefficient (%)=[(<W2>−<W1>)/<W1>]×100. In this index, a water absorption coefficient of 10% or less is preferable because generation of voids during molding and molding defects are suppressed.

The prepreg is required to have a sticking property, that is, tackiness, which is required for laminating the prepregs or applying the prepreg to a mold. An example of the evaluation method of tackiness is a method using a tackiness tester (PICMA tackiness tester II manufactured by Toyo Seiki Seisaku-sho, Ltd.) in which a 10 mm×10 mm aluminum plate is pressure-bonded to a prepreg for 5 seconds with a force of 0.4 kgf (3.92 N), the prepreg is pulled at a rate of 30 mm/min, and the resistive force when the prepreg is delaminated is measured as tackiness. In this case, a tackiness of 0.1 kgf (0.98 N) or more can maintain a sufficient sticking property. Moreover, when the prepreg is applied to a mold, the mold may have a metal surface having mold release property. Therefore, the prepreg is sometimes required to have a sticking property to a metal plate. The sticking property of the obtained prepreg to a metal plate can be evaluated based on whether the prepreg falls off the metal plate or not when three 10-cm square prepregs are laminated in the same direction on a metal plate treated with a fluorine mold release agent, and the metal plate is vertically stood and left for 1 hour. When the prepreg is stuck to the metal plate without falling, the prepreg has a sufficient sticking property to the metal plate.

When a carbon fiber woven fabric is used as a fiber base material, the percentage of gaps formed at the entangled portion of the warp and weft of the carbon fiber woven fabric is preferably 5% or less at the time the prepreg is produced for improving the quality of the surface of the formed carbon fiber-reinforced composite material and uniformizing the mechanical properties. The front surface of a woven fabric prepreg is photographed with a stereoscopic microscope under light from the back surface of the woven fabric prepreg. A photograph of a transmitted light pattern of the woven fabric is obtained, in which the yarn portion is black and the gap portion is white. The photograph is subjected to image processing, and the percentage of the gaps can be calculated by S2/S1 wherein S1 is the total area, and S2 is the area of the white portion (gap portion).

The carbon fiber-reinforced composite material according to the present invention is produced by a method of laminating the above-mentioned prepregs, and then thermally curing the resin while pressurizing the resulting laminate. Herein, examples of the method for applying heat and pressure include press molding, autoclave molding, bagging molding, wrapping, and an internal pressure molding method. The wrapping is a method of winding a prepreg on a cored bar such as a mandrel to form a tube made of a carbon fiber-reinforced composite material, and is suitable for producing a rod such as a golf shaft and a fishing rod. More specifically, wrapping is a method of winding a prepreg on a mandrel, winding a wrapping tape made of a thermoplastic resin film on the outside of the prepreg for fixing and pressurizing the prepreg, thermally curing the resin in an oven, and then removing the cored bar to form a tube. The internal pressure molding method is a method of setting a preform, which is obtained by winding a prepreg on an internal pressure applicator such as a thermoplastic resin tube, in a mold, and then introducing a high-pressure gas into the internal pressure applicator to pressurize the prepreg while heating the mold. This method is preferably used in forming articles having complicated shapes, such as golf shafts, bats, and rackets for tennis, badminton and the like.

The optimum curing temperature and curing time for forming the carbon fiber-reinforced composite material of the present invention in an autoclave or oven vary depending on the type and amount of the selected hardener and hardening catalyst. In applications in which heat resistance to a temperature of 130° C. or higher is required, curing is preferably performed at a temperature of 120 to 220° C. for 0.5 to 8 hours. The temperature ramp rate is preferably 0.1 to 10° C./min. If the temperature ramp rate is less than 0.1° C./min, the time before reaching the target curing temperature may be very long, and the workability may be lowered. Alternatively, if the temperature ramp rate exceeds 10° C./min, there may be a temperature difference among various parts of the reinforced fiber due to the influence of air flow or internal heat generation, so that a uniform cured product may not be obtained.

When forming the carbon fiber-reinforced composite material of the present invention, the pressure may be increased or decreased as necessary, although it is not essential. Increasing or decreasing the pressure may produce effects such as improvement in surface quality, suppression of internal voids, and improvement in adhesion with metal or plastic to be adhered during curing or with a component made of a fiber-reinforced composite material.

Furthermore, the carbon fiber-reinforced composite material of the present invention can also be produced by a method of directly impregnating a reinforced fiber with the epoxy resin composition of the present invention and then thermally curing the epoxy resin composition without using a prepreg, such as molding methods including hand lay-up, filament winding, pultrusion, resin injection molding, and resin transfer molding.

The carbon fiber-reinforced composite material of the present invention is preferably used in aircraft structural members, wind turbine blades, automobile outer panels, computer applications such as IC trays and casings (housings) for laptop computers, and further in sports applications such as golf shafts and tennis rackets.

EXAMPLES

Hereinafter, the present invention is described in more detail by way of examples. Various physical properties were measured by the following methods. Unless otherwise noted, the physical properties were measured in an environment at a temperature of 23° C. and 50% relative humidity.

Component [A]
"jER (registered trademark)" YX7700 (phenol-modified xylene resin type epoxy manufactured by Mitsubishi Chemical Corporation, epoxy equivalent: 270 g/eq)

Component [B]
"ARALDITE (registered trademark)" MY721 (tetraglycidyl diaminodiphenylmethane manufactured by Huntsman Advanced Materials LLC, epoxy equivalent: 112 g/eq)
"TGDDS (tetraglycidyl diaminodiphenyl sulfone manufactured by Konishi Chemical Ind. Co., Ltd., epoxy equivalent: 112 g/eq)
"ARALDITE (registered trademark)" (registered trademark) MY0510 (triglycidyl-p-aminophenol manufactured by Huntsman Advanced Materials LLC, epoxy equivalent: 100 g/eq)
"ARALDITE (registered trademark)" registered trademark) MY0600 (triglycidyl-m-aminophenol manufactured by Huntsman Advanced Materials LLC, epoxy equivalent: 105 g/eq)

Component [C]
"Sumika Excel (registered trademark)" PES5003P (hydroxyl group-terminated polyethersulfone manufactured by SUMITOMO CHEMICAL COMPANY, LIMITED, Tg=225° C.)
"Virantage (registered trademark)" VW-10700RP (hydroxyl group-terminated polyethersulfone manufactured by Solvay Advanced Polymers LLC, Tg=220° C.)
"Sumika Excel (registered trademark)" PES7600P (chlorine-terminated polyethersulfone manufactured by SUMITOMO CHEMICAL COMPANY, LIMITED, Tg=225° C.)
"Virantage (registered trademark)" VW-30500RP (polysulfone manufactured by Solvay Advanced Polymers LLC, Tg=205° C.)
"ULTEM (registered trademark)" 1010 (polyetherimide manufactured by Sabic Innovative Plastics, Tg=215° C.)

Component [D]
3,3'-DAS (3,3'-diaminodiphenyl sulfone manufactured by Mitsui Fine Chemicals, Inc., active hydrogen equivalent: 62 g/eq, solid at 23° C.)
SEIKACURE S (4,4'-diaminodiphenyl sulfone manufactured by Wakayama Seika Kogyo Co., Ltd., active hydrogen equivalent: 62 g/eq, solid at 23° C.)
"Lonzacure (registered trademark)" MIPA (4,4'-methylenebis(2-methyl-6-isopropyl)benzenamine manufactured by Lonza, active hydrogen equivalent: 78 g/eq, solid at 23° C.)

Component [E]
"jER (registered trademark)" 825 (phenol A type epoxy manufactured by Mitsubishi Chemical Corporation, epoxy equivalent: 175 g/eq)
Novolac epoxy resin
"EPICLON (registered trademark)" N-775 (phenol-modified novolac epoxy resin manufactured by DIC Corporation, epoxy equivalent: 190 g/eq)
Active ester resin
"EPICLON (registered trademark)" HPC-8000-65T (manufactured by DIC Corporation, active group equivalent: 223 g/eq, a toluene solution having a nonvolatile content of 65 mass %)
Accelerator
4-Dimethylaminopyridine (manufactured by Tokyo Chemical Industry Co., Ltd.), used in the state of a solution adjusted by MEK (manufactured by Wako Pure Chemical Industries, Ltd.) so that the solid content will be 2 mass %

(1) Preparation of Epoxy Resin Composition

In Examples 1 to 13 and Comparative Examples 1 to 4, 6, and 7, the epoxy resin as the component [B] and the thermoplastic resin as the component [C] were heated and kneaded to dissolve the component [C], whereby a transparent viscous liquid was obtained. The epoxy resin as the component [A] and the hardener as the component [D] were added to the liquid and the resulting mixture was kneaded to produce an epoxy resin composition. The compounding ratios among components (parts by mass) of examples and comparative examples are as shown in Tables 1 to 3.

In Comparative Example 5, the epoxy resin as the component [B] and the thermoplastic resin as the component [C] were heated and kneaded to dissolve the component [C], whereby a transparent viscous liquid was obtained. The epoxy resin as the component [A], 180 parts by mass of a solution containing an active ester resin, and 6 parts by mass of a solution containing an accelerator were added to the liquid and the resulting mixture was kneaded to produce an epoxy resin composition. The compounding ratio among components of Comparative Example 5 is as shown in Table 3.

(2) Bending Test of Cured Resin

In Examples 1 to 13 and Comparative Examples 1 to 4, 6, and 7, the uncured resin composition was defoamed in a vacuum, and then cured in a mold set to a thickness of 2 mm with a 2-mm thick "TEFLON (registered trademark)" spacer at a temperature of 180° C. for 2 hours. The obtained cured resin having a thickness of 2 mm was cut to a width of 10±0.1 mm and a length of 60±1 mm to produce a test piece. Using an Instron universal tester (manufactured by Instron), 3-point bending was performed at a span interval of 32 mm according to JIS-K7171 (1994), and the elastic modulus was measured. The number of measurements was N=6, and the average of the measured values was determined.

In Comparative Example 5, the same operation as described above was performed except that the obtained epoxy resin composition was poured into a mold set to a thickness of 2 mm with a 2-mm thick "TEFLON (registered trademark)" spacer, vacuuming was performed at 70° C. for 24 hours, toluene and MEK were removed, and then the uncured resin composition was cured in the mold at a temperature of 100° C. for 30 minutes and at a temperature of 180° C. for 2 hours. A cured resin having an elastic modulus of 4.0 GPa or more was rated as pass.

(3) Bending Test of Moistened Cured Resin in High-Temperature Environment

The test piece produced to have the dimensions described in item (2) was immersed in a thermostatic water bath at 98° C. for 20 hours. Then, the thermostat bath installed in the Instron universal tester (manufactured by Instron) described in item (2) was set to 121° C., the test piece was kept in the environment within the bath for 3 minutes, and then the elastic modulus was measured under the same measurement conditions as in item (2). A cured resin having an elastic modulus in a moistened high-temperature environment of 2.4 GPa or more was rated as pass.

(4) Tg of Cured Resin

As for the glass transition temperature of the cured resin obtained in item (2), the midpoint temperature determined according to JIS-K7121 (1987) using a differential scanning calorimeter (DSC) was regarded as Tg. A cured resin having a Tg of 165° C. or higher was rated as pass.

(5) Production of Woven Fabric Prepreg

The epoxy resin composition prepared in item (1) was applied to release paper to produce a resin film having a predetermined resin areal weight. The resin films were set in a prepreg production machine, and laminated on both surfaces of a reinforced fiber woven fabric, and the resulting laminate was heated and pressurized to impregnate the thermosetting resin composition into the woven fabric. In this manner, a woven fabric prepreg having a fiber areal weight of 193 g/m$^2$ and a resin content of 38 mass % was produced. The reinforced fiber woven fabric used was a plain weave fabric made of "TORAYCA (registered trademark)" T400H-3K (number of fibers: 3,000, tensile strength: 4,410 MPa, tensile modulus: 250 MPa, tensile elongation: 1.8%). In Comparative Example 5, toluene and MEK were removed from the epoxy resin composition and then the epoxy resin composition was applied to release paper.

(6) Tensile Test of Fiber-Reinforced Composite Material

Woven fabric prepregs were laminated with the warp directions of the prepregs being aligned, and the resulting laminate was heated and pressurized to cure in an autoclave at a temperature of 180° C. and a pressure of 6.1 kgf/cm$^2$ for 2 hours, whereby a composite material was produced. From the obtained composite material, a test piece having a width of 25±0.5 mm, a length of 250±1.0 mm, and a span between tabs of 130±1.0 mm was produced, and the tensile strength of the warp was measured according to EN2597B. A composite material having a tensile strength of the warp of 770 MPa or more was rated as pass.

(7) Compression Test of Fiber-Reinforced Composite Material

Nine woven fabric prepregs were laminated with the warp directions of the prepregs being aligned, and the resulting laminate was molded into a composite material under the molding conditions as in item (6). From the composite material, a test piece having a width of 12.5±0.2 mm, a length of 75 to 80 mm, and a span between tabs of 5.25±0.25 mm was produced, and the compression strength of the warp was measured according to EN2850B. A composite material having a compression strength of the warp of 840 MPa or more was rated as pass.

TABLE 1

| | | Example 1 | Example 2 | Example 3 | Example 4 | Example 5 | Example 6 | Example 7 |
|---|---|---|---|---|---|---|---|---|
| Component [A] | YX7700 | 50 | 60 | 80 | 40 | 40 | 50 | 50 |
| Component [B] | MY721 | 50 | | | | | | |
| | TGDDS | | | 20 | | | | 50 |
| | MY0510 | | 40 | | | | 50 | |
| | MY0600 | | | | 60 | 60 | | |
| Component [C] | PES5003P | 5 | | | | | | 1 |
| | VW-10700RP | | | | | | 25 | |
| | PES7600P | | | | 10 | 10 | | |
| | VW-30500RP | | | 10 | | | | |
| | "ULTEM (registered trademark)" 1010 | | 5 | | | | | |
| Component [D] | 3,3'-DAS | 45 | 45 | | 50 | | 50 | |
| | SEIKACURE S | | | | | 50 | | 50 |
| | "Lonzacure (registered trademark)" MIPA | | | 35 | | | | |

TABLE 1-continued

|  |  | Example 1 | Example 2 | Example 3 | Example 4 | Example 5 | Example 6 | Example 7 |
|---|---|---|---|---|---|---|---|---|
| Component [E] | jER825 |  |  |  |  |  |  |  |
| Novolac epoxy resin | N-775 |  |  |  |  |  |  |  |
| Active ester resin | HPC-8000-65T |  |  |  |  |  |  |  |
| Accelerator | 4-Dimethyl aminopyridine |  |  |  |  |  |  |  |
|  | [A]/[B] | 1.0 | 1.5 | 4.0 | 0.67 | 0.67 | 1.0 | 1.0 |
| Amount of [C] to 100 parts by mass in total of epoxy resins |  | 5 | 5 | 10 | 10 | 10 | 25 | 1 |
| Elastic modulus of cured resin [GPa] |  | 4.4 | 4.2 | 4.0 | 4.6 | 4.1 | 4.2 | 4.1 |
| Elastic modulus of cured resin in moistened high-temperature environment [GPa] |  | 3.1 | 2.9 | 2.8 | 2.7 | 2.5 | 2.7 | 2.9 |
| Tg of cured resin [° C.] |  | 191 | 189 | 198 | 182 | 199 | 181 | 183 |
| Tensile strength of warp [MPa] |  | 817 | 805 | 794 | 800 | 791 | 847 | 842 |
| Compression strength of warp [MPa] |  | 888 | 870 | 850 | 905 | 864 | 872 | 864 |

TABLE 2

|  |  | Example 8 | Example 9 | Example 10 | Example 11 | Example 12 | Example 13 |
|---|---|---|---|---|---|---|---|
| Component [A] | YX7700 | 10 | 80 | 20 | 70 | 30 | 30 |
| Component [B] | MY721 | 90 | 20 | 80 | 30 | 70 | 70 |
|  | TGDDS |  |  |  |  |  |  |
|  | MY0510 |  |  |  |  |  |  |
|  | MY0600 |  |  |  |  |  |  |
| Component [C] | PES5003P | 5 | 5 | 5 | 5 |  |  |
|  | VW-10700RP |  |  |  |  |  |  |
|  | PES7600P |  |  |  |  |  |  |
|  | VW-30500RP |  |  |  |  | 10 | 10 |
|  | "ULTEM (registered trademark)" 1010 |  |  |  |  |  |  |
| Component [D] | 3,3'-DAS | 45 | 45 | 45 | 45 | 35 |  |
|  | SEIKACURE S |  |  |  |  |  | 35 |
|  | "Lonzacure (registered trademark)" MIPA |  |  |  |  |  |  |
| Component [E] | jER825 |  |  |  |  |  |  |
| Novolac epoxy resin | N-775 |  |  |  |  |  |  |
| Active ester resin | HPC-8000-65T |  |  |  |  |  |  |
| Accelerator | 4-Dimethyl aminopyridine |  |  |  |  |  |  |
|  | [A]/[B] | 0.11 | 4.0 | 0.25 | 2.3 | 0.43 | 0.43 |
| Amount of [C] to 100 parts by mass in total of epoxy resins |  | 5 | 5 | 5 | 5 | 10 | 10 |
| Elastic modulus of cured resin [GPa] |  | 4.4 | 4.3 | 4.5 | 4.4 | 4.4 | 4.0 |
| Elastic modulus of cured resin in moistened high-temperature environment [GPa] |  | 2.4 | 2.7 | 2.5 | 2.8 | 2.6 | 2.4 |
| Tg of cured resin [° C.] | | 221 | 168 | 214 | 176 | 190 | 206 |
| Tensile strength of warp [MPa] | | 772 | 840 | 775 | 875 | 803 | 770 |
| Compression strength of warp [MPa] | | 840 | 860 | 880 | 875 | 862 | 851 |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component [A] | YX7700 | 90 | 40 | 40 |  | 50 | 5 | 95 |
| Component [B] | MY721 |  |  |  |  | 50 | 90 | 5 |
|  | TGDDS |  | 10 |  |  |  |  |  |
|  | MY0510 |  |  |  |  |  |  |  |
|  | MY0600 |  |  | 60 | 60 | 60 |  |  |

TABLE 3-continued

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component [C] | PES5003P | | | | | 5 | 5 | 5 |
| | VW-10700RP | 10 | | 30 | | | | |
| | PES7600P | | | | 10 | | | |
| | VW-30500RP | | | | | | | |
| | "ULTEM (registered trademark)" 1010 | | | | | | | |
| Component [D] | 3,3'-DAS | | | | | | 45 | 45 |
| | SEIKACURE S | | 50 | 50 | 50 | | | |
| | "Lonzacure (registered trademark)" MIPA | 35 | | | | | | |
| Component [E] | jER825 | | | | | | 5 | |
| Novolac epoxy resin | N-775 | | | | 40 | | | |
| Active ester resin | HPC-8000-65T | | | | | 180 | | |
| Accelerator | 4-Dimethyl aminopyridine | | | | | 6 | | |
| | [A]/[B] | 9.0 | 0.67 | 0.67 | — | 1.0 | 0.06 | 19 |
| Amount of [C] to 100 parts by mass in total of epoxy resins | | 10 | 0 | 30 | 17 | 5 | 5 | 5 |
| Elastic modulus of cured resin [GPa] | | 3.7 | 4.2 | 3.9 | 3.6 | 3.7 | 4.3 | 4.3 |
| Elastic modulus of cured resin in moistened high-temperature environment [GPa] | | 2.4 | 2.6 | 2.1 | 2.2 | 2.6 | 2.3 | 2.5 |
| Tg of cured resin [° C.] | | 170 | 200 | 190 | 221 | 210 | 213 | 157 |
| Tensile strength of warp [MPa] | | 880 | 730 | 854 | 721 | 757 | 725 | 801 |
| Compression strength of warp [MPa] | | 825 | 870 | 810 | 818 | 827 | 880 | 855 |

Examples 1 to 13

As shown in Tables 1 and 2, in Examples 1 to 13, the components [A], [B], [C], and [D] were blended, and the resulting cured resins and fiber-reinforced composite materials were tested. For all the physical properties including the elastic modulus, Tg, tensile strength of the warp, and the compression strength of the warp, good results were obtained.

Comparative Examples 1 to 7

As shown in Table 3, when too large an amount of the component [A] was blended as in Comparative Example 1, the elastic modulus of the cured resin, the Tg of the cured resin, and the compression strength of the warp decreased. When the epoxy resin composition did not contain the component [C] as in Comparative Example 2, the tensile strength of the warp decreased. When too large an amount of the component [C] was blended as in Comparative Example 3, all of the elastic modulus of the cured resin, the elastic modulus of the cured resin in a moistened high-temperature environment, and the compression strength of the warp decreased. When the epoxy resin composition contained a novolac epoxy resin instead of the component [A] as in Comparative Example 4, the elastic modulus of the cured resin, the elastic modulus of the cured resin in a moistened high-temperature environment, the tensile strength of the warp, and the compression strength of the warp decreased. When the epoxy resin composition contained an active ester resin as a hardener and 4-dimethylaminopyridine as an accelerator instead of the component [D] as in Comparative Example 5, the elastic modulus of the cured resin, the tensile strength of the warp, and the compression strength of the warp decreased. When too small an amount of the component [A] was blended and the component [E] was blended instead as in Comparative Example 6, the elastic modulus of the cured resin in a moistened high-temperature environment, and the tensile strength of the warp decreased. When too large an amount of the component [A] was blended as in Comparative Example 7, the Tg of the cured resin significantly decreased.

The invention claimed is:

1. An epoxy resin composition comprising at least components [A] to [D] shown below:
   [A]: an epoxy resin having a xylene group;
   [B]: a glycidyl amine epoxy resin having three or more glycidyl groups in a molecule;
   [C]: a thermoplastic resin; and
   [D]: an aromatic polyamine,
wherein:
   the epoxy resin composition comprising 10 to 80 parts by mass of the component [A] and 90 to 20 parts by mass of the component [B] based on 100 parts by mass in total of epoxy resins, and also 1 to 25 parts by mass of the component [C] based on 100 parts by mass in total of epoxy resins,
   a mixing ratio [A]/[B] between the component [A] and the component [B] being 0.25 to 2.3, and
   the component [A] having an epoxy equivalent of 200 to 350 g/eq.

2. The epoxy resin composition according to claim 1, comprising 40 to 80 parts by mass of the component [A] and 60 to 20 parts by mass of the component [B] based on 100 parts by mass in total of epoxy resins.

3. The epoxy resin composition according to claim 2, wherein the component [D] is an aromatic polyamine having 1 to 4 phenyl groups in a molecule, and at least one of the phenyl groups has an amino group at an ortho position or a meta position.

4. A prepreg comprising a carbon fiber, and the epoxy resin composition according to claim 2 impregnated into the carbon fiber.

5. A carbon fiber-reinforced composite material comprising a cured product of the epoxy resin composition according to claim 2, and a carbon fiber.

6. The epoxy resin composition according to claim 1, wherein the component [D] is an aromatic polyamine having 1 to 4 phenyl groups in a molecule, and at least one of the phenyl groups has an amino group at an ortho position or a meta position.

7. A prepreg comprising a carbon fiber, and the epoxy resin composition according to claim 6 impregnated into the carbon fiber.

8. A prepreg comprising a carbon fiber, and the epoxy resin composition according to claim 1 impregnated into the carbon fiber.

9. The prepreg according to claim 8, wherein the carbon fiber is in a form of a woven fabric.

10. A carbon fiber-reinforced composite material that is a cured product of the prepreg according to claim 9.

11. A carbon fiber-reinforced composite material that is a cured product of the prepreg according to claim 8.

12. A carbon fiber-reinforced composite material comprising a cured product of the epoxy resin composition according to claim 1, and a carbon fiber.

\* \* \* \* \*